United States Patent
Mock

(10) Patent No.: US 7,960,658 B2
(45) Date of Patent: Jun. 14, 2011

(54) BAYONET-COUPLED DRAFT SHIELD ARRANGEMENT FOR BALANCE

(75) Inventor: Daniel Mock, Oberengstringen (CH)

(73) Assignee: Mettler-Toledo AG, Greifensee (CH)

( * ) Notice: Subject to any disclaimer, the term of this patent is extended or adjusted under 35 U.S.C. 154(b) by 327 days.

(21) Appl. No.: 12/360,365

(22) Filed: Jan. 27, 2009

(65) Prior Publication Data

US 2009/0194340 A1 Aug. 6, 2009

(30) Foreign Application Priority Data

Feb. 6, 2008 (EP) .................................... 08151093

(51) Int. Cl.
*G01G 21/28* (2006.01)

(52) U.S. Cl. .................... 177/126; 177/180; 177/238

(58) Field of Classification Search .............. 285/396; 177/126, 127, 180, 181, 238
See application file for complete search history.

(56) References Cited

U.S. PATENT DOCUMENTS

| | | | | |
|---|---|---|---|---|
| 7,318 A | * | 4/1850 | Brown | 285/396 |
| 177,729 A | * | 5/1876 | Loring | 285/396 |
| 3,674,287 A | * | 7/1972 | Selley | 285/7 |
| 4,065,890 A | * | 1/1978 | Fenner | 52/27 |
| 4,305,180 A | * | 12/1981 | Schwartz | 439/296 |
| 5,029,973 A | * | 7/1991 | Rink | 385/60 |
| 5,074,369 A | * | 12/1991 | Strickler | 177/180 |
| 5,149,149 A | * | 9/1992 | Wu | 285/402 |
| 5,152,356 A | * | 10/1992 | Strickler et al. | 177/180 |
| 5,583,322 A | | 12/1996 | Leisinger et al. | |
| 6,566,614 B1 | | 5/2003 | Flückiger et al. | |
| 7,017,953 B2 | * | 3/2006 | Benscoter et al. | 285/401 |
| 7,193,164 B2 | | 3/2007 | Olesen et al. | |

FOREIGN PATENT DOCUMENTS

JP 2005-227212 A 8/2005

* cited by examiner

*Primary Examiner* — Randy W Gibson

(74) *Attorney, Agent, or Firm* — Standley Law Group LLP

(57) ABSTRACT

A balance (1) has a balance housing (2), which, when the balance is set up for operation, has an opening at its topside to pass a load-introducing member (4). The housing has a draft shield arrangement (5), separable from, and attachable to, the housing. An opening (7) on a floor (6) of the draft shield arrangement corresponds to the housing opening and allows the load-introducing member to pass. A design that facilitates cleaning while keeping the height of the balance low is achieved with a fastening arrangement (8) for the draft shield arrangement. The fastening arrangement allows the draft shield arrangement to be fastened centrally at the load-introducing member passage. A rim on the housing opening operates as a first part (8') and provides a form-locking connection with a second part that is attached to the draft shield arrangement at the draft shield floor opening.

14 Claims, 3 Drawing Sheets

BAYONET-COUPLED DRAFT SHIELD ARRANGEMENT FOR BALANCE

CROSS-REFERENCE TO RELATED APPLICATIONS

This application is entitled to, and claims, a benefit of a right of priority under 35 USC §119 from European patent application 08 15 1093.5, filed on 6 Feb. 2008, the content of which is incorporated by reference as if fully recited herein.

TECHNICAL FIELD

The invention concerns a balance with a balance housing to accommodate the functional elements of the balance wherein, for a balance that is set up for operation, the balance housing has at its topside an opening for the passage of the load-introducing member and is equipped with a draft shield arrangement which in its entirety can be separated from and attached to the balance housing, and wherein the floor of the draft shield arrangement also has an opening that matches the opening of the balance housing for the passage of the load-introducing member.

BACKGROUND OF THE ART

Draft shield arrangements have the purpose to ensure that air drafts do not compromise the weighing result in precision balances. To perform this function, draft shield arrangements normally have a floor, side walls and a top cover, with the side walls and/or the top cover normally being designed so that they can be opened in order to put the weighing object in place. To perform the weighing function, the load-introducing member is designed to also reach into this draft shield arrangement and is then provided with a receiving element for the weighing object, for example a weighing pan.

A balance of the kind described above is presented in commonly-owned U.S. Pat. No. 6,566,614. There, the draft shield arrangement can be set on the balance housing, whereupon a sliding latch is moved which makes a solid connection between the balance housing and the draft shield arrangement. A sliding latch of this kind has the disadvantage that it involves a complicated mechanism which has to be accommodated in the floor plate of the draft shield arrangement. The mechanism requires a guiding constraint for the sliding latch which allows a sliding movement and also securely holds the sliding latch, and it is further necessary to provide the sliding latch as well as the topside of the housing with suitable locking elements. This mechanism, in particular the guiding constraint for the sliding latch, is difficult to clean and has to be taken apart for a thorough cleaning. Furthermore, due to the thickness of the floor of the draft shield arrangement, the overall height of the balance is increased, which makes the balance less user-friendly and affects the operating ergonomics of the balance unfavorably in particular with regard to the access to the weighing pan.

It is therefore the object of the invention to provide a simple and easy-to-clean fastening arrangement for the draft shield arrangement of a balance of the kind described above while keeping the overall height as low as possible.

SUMMARY

According to the embodiments described hereinafter, this task is solved through a concept that allows the draft shield arrangement to be fastened centrally at the passage for the load-introducing member, wherein the border of the opening at the topside of the balance is configured as a first part of a fastening arrangement which cooperates in the sense of a form-locking connection with a second part of the fastening arrangement that is arranged at the opening of the floor of the draft shield arrangement and serves for the attachment of the draft shield arrangement on the balance housing.

The concept disclosed has the advantage that the floor for the draft shield arrangement can take the form of a simple plate which only carries the second part of the fastening arrangement, but that there are no other components such as guiding constraints. The connection of the second part of the fastening arrangement to the floor can be accomplished in a simple manner, so that the height of the floor, and thus the overall height of the balance, can be kept low, while the cleaning can be performed easily.

A substantial improvement in the sense of the objective stated above is further achieved through a design where the second part of the fastening arrangement is attached to the floor of the draft shield arrangement in such a way that it can easily be disconnected. This means that the connection can be released without any tool and with a simple manipulation. In this way the cleaning can be performed with the greatest of ease by disconnecting the second part of the fastening arrangement, because all that remains to be cleaned in this case is the floor plate with its opening. There are no additional components left to deal with, and in particular none with a complicated configuration. The removed second part of the fastening arrangement can be designed as a part of simple configuration which can be put through a separate cleaning procedure, which will in this case likewise be easy to perform.

The attachment of the second part of the fastening arrangement to the floor of the draft shield arrangement can be accomplished in different ways. It is possible that the parts involved are designed so that the second part of the fastening arrangement can be snapped or screwed to the floor. However, it is particularly advantageous if the second part of the fastening arrangement is given a ring-shaped configuration and cooperates with the opening of the floor in the manner of a bayonet coupling. This makes the part particularly easy to disconnect and reconnect, which greatly facilitates cleaning.

According to one embodiment, the second part of the fastening arrangement has outward-oriented projections which fit into cutouts of the opening of the floor, so that this second part of the fastening arrangement connects to the floor by turning it in the opening. As a practical matter, the underside of the floor is in this case equipped with at least one stop to define the limit of the turning movement.

According to a further developed version, the second part of the fastening arrangement has a channel on the topside to catch and drain liquids. This measure serves to prevent that spilled liquids could get into the interior of the balance and cause malfunctions.

The connection between the first and second parts of the fastening arrangement for the draft shield arrangement on the balance housing can likewise be configured in different ways, with a bayonet coupling again being a practical solution. This bayonet coupling can be of similar configuration as the aforedescribed bayonet coupling of the second part of the fastening arrangement in the floor of the draft shield arrangement. There are of course other designs of bayonet couplings which could be used as alternative solutions, such as for example bayonet couplings with pins, slots, springs or the like.

As a practical matter, the firm hold of this bayonet coupling is likewise secured through a force-locked engagement. The latter can be overcome with a smaller force than the hold of the bayonet coupling which connects the second part to the floor of the draft shield arrangement, so that when the draft shield arrangement is installed or disconnected, the second part of the fastening arrangement remains connected to the floor of the draft shield arrangement.

The fact that the draft shield arrangement is connected centrally at the passage for the load-introducing member also makes it possible for the floor of the draft shield arrangement to function as a shock absorber, if the floor is made of a material with resilient and attenuating properties. Thus, impact forces that may hit the draft shield arrangement are damped along their propagation into the balance. This has the advantage that oscillations caused by this kind of an impact will decay faster, whereby the waiting time until a weighing process can take place is shortened, so that lost time is avoided.

Lastly, it is also possible that a metallic floor plate is inserted between the topside of the balance housing and the floor of the draft shield arrangement in order to establish an electrical ground connection. This should be considered especially if the floor of the draft shield arrangement is made of a plastic or other non-conductive material.

The draft shield arrangement by itself can be of a conventional design, for example with side walls that slide in track grooves for closing and opening. It is desirable if all of the walls can be taken out for cleaning. The cover, too, can be opened by sliding or by tilting on a hinge in order to bring in or take out a weighing object.

BRIEF DESCRIPTION OF THE DRAWINGS

A better understanding of the concepts disclosed herein will be had by referring to the accompanying drawings, wherein identical parts are identified with identical reference numbers and wherein.

DETAILED DESCRIPTION

Figure 1:
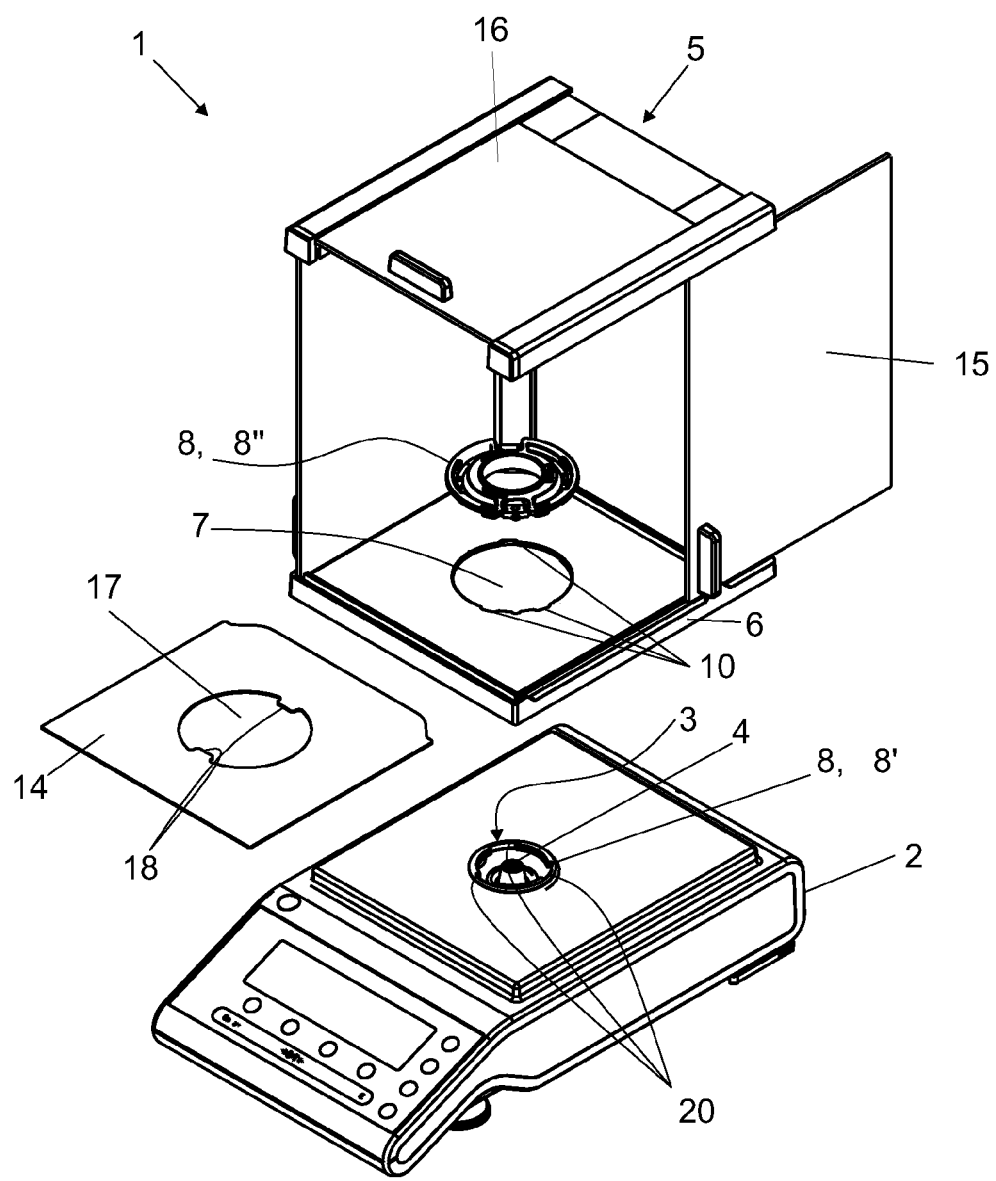
FIG. 1 represents a balance with a balance housing and a draft shield arrangement.

FIG. 1 illustrates a balance 1 with a balance housing 2 and a draft shield arrangement 5. The draft shield arrangement 5 has been taken off the balance housing 2, whereby the first part 8' of the fastening arrangement 8 on the balance housing 2 has become visible. This first part 8' of the fastening arrangement 8 is arranged at the rim of the opening 3, the latter serving as passage for the load-introducing member 4. A receiving element for the weighing object, for example a weighing pan, is set on the load-introducing member 4.

In order to prevent air drafts from affecting the precision of the weighing process, the draft shield arrangement 5 is set on top of the balance housing 2. This purpose is served by a second part 8" of the fastening arrangement 8. The second part 8" can cooperate with the first part 8' of the fastening arrangement in the sense of a bayonet coupling as outlined in the drawing. Bayonet couplings of different configurations can be used here, as will be familiar to professionals in this field.

This simple design of the fastening arrangement 8 and the way it is set up at the opening 3 of the balance housing 2 for the passage of the load-introducing member 4, as well as the way it fits into the opening 7 of the floor 6 of the draft shield arrangement 5 are essential aspects of the invention. The first part 8' and the second part 8" of the fastening arrangement 8 can simply be set into or can be arranged in the openings 3 and 7. Further elements or special design adaptations are not necessary. The inventive concept thus allows a low overall height and a simple design, and facilitates cleaning.

However, it is of particular practical value if the second part 8" of the fastening arrangement can be set into and taken out of the floor 6 in a simple manner. This makes in particular the floor 6 of the draft shield arrangement 5 even easier and better to clean, and it will likewise be easy to separately perform a thorough cleaning of the second part 8" of the fastening arrangement 8.

The second part 8" of the fastening arrangement 8 can be set into place by means of a bayonet coupling, for example in such a way that the outward-pointing first projections 19 are put through cutouts 10 of the opening 7 in the floor 6 of the draft shield arrangement 5 and secured by a turning movement. In this turning movement, the first projections 19 slide under the rim of the opening 7 until the turn ends at a rotation-delimiting element which functions as a stop.

FIG. 1 further shows a metallic floor plate 14 which can be set into the floor 6 of the draft shield arrangement 5 after the latter has been installed on the balance housing 5, in order to provide an electrical ground connection. Of course, this metallic floor plate 14 likewise has an opening 17 for the passage of the load-introducing member 4. The rim of the opening 17 can have projections 18 which work together with cutouts on the fastening arrangement 8, so that the metallic floor plate 14 can be installed in only one position of the second part 8" of the fastening arrangement 8, whereby a wrong installation is prevented.

Figure 2:
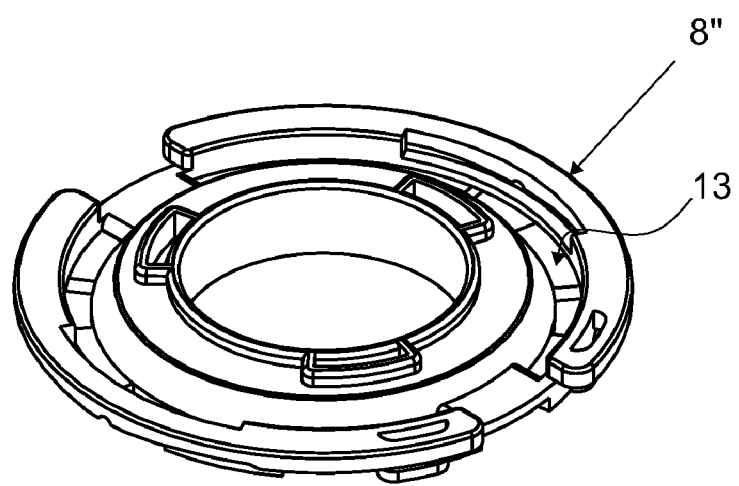
FIG. 2 shows a second part of the fastening arrangement, seen from above.

FIG. 2 shows the second part 8" of the fastening arrangement 8 in a view from above, whereby the channel 13 becomes visible, which has the purpose to catch liquids that were inadvertently spilled and to drain them away between the floor 6 of the draft shield arrangement 5 and the topside of the balance housing 2 and thus to prevent the liquids from getting inside the balance housing 2.

Figure 3:
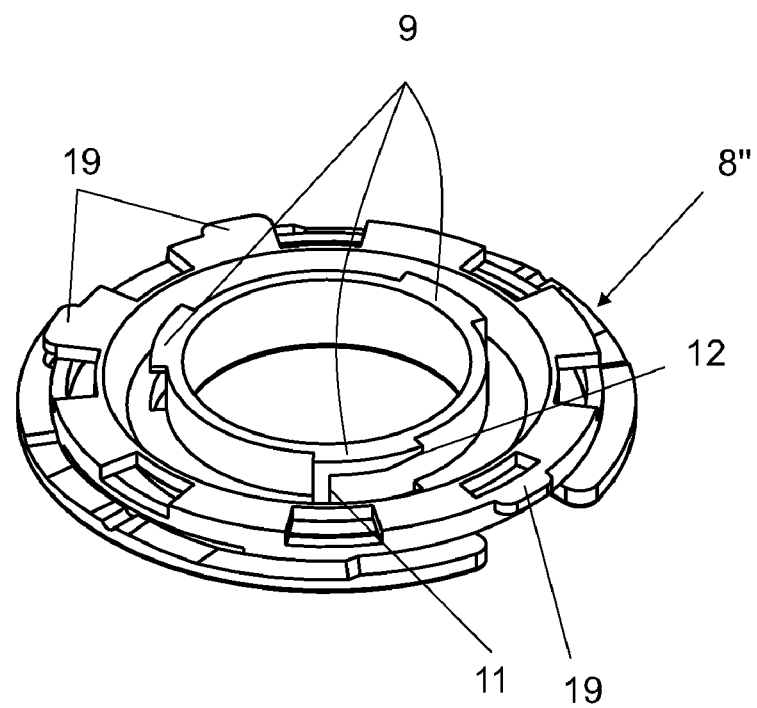
FIG. 3 shows the second part of the fastening arrangement, seen from below.

FIG. 3 shows the second part 8" of the fastening arrangement 8 from the underside. Second projections 9 can be seen which in the process of fastening the draft shield arrangement 5 to the balance housing 2 will fit through matching cutouts 20 of the opening 3, and by turning the second part 8" of the fastening arrangement 8 the second part is locked to the balance housing 2. Each of the projections 9 has a rotation-delimiting element 11 which functions as a stop. Therefore the second part 8" of the fastening arrangement 8 cannot be inadvertently turned loose, the projections 9 have tightening ramps 12 which have to some extent a force-locking effect.

Figure 4:
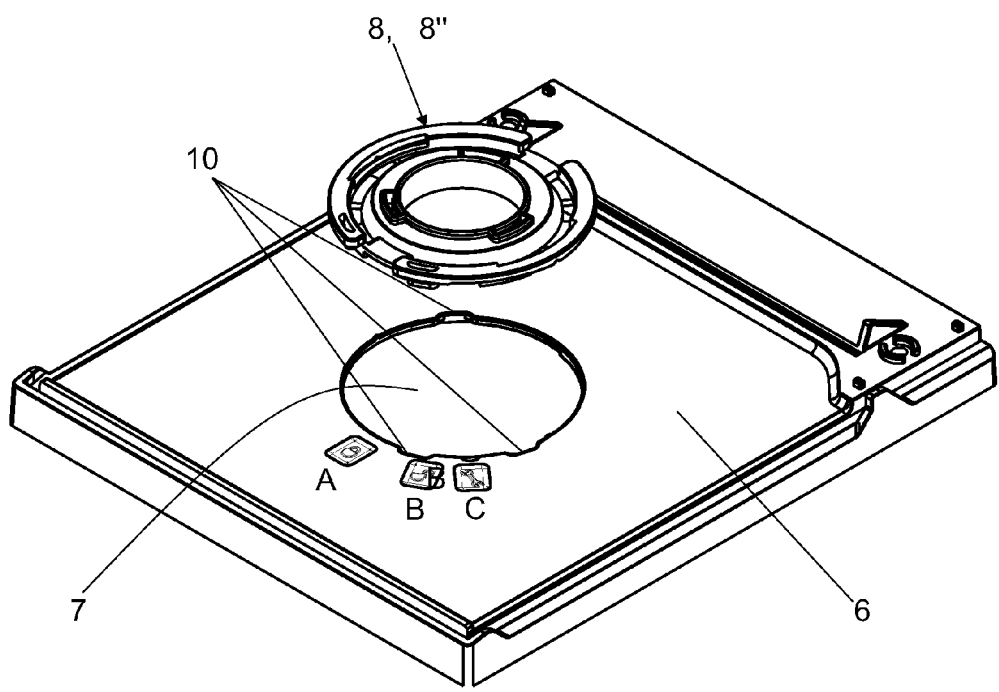
FIG. 4 shows the floor of the draft shield arrangement and the second part of the fastening arrangement.

FIG. 4 shows the floor 6 of the draft shield arrangement 5 and the second part 8" of the fastening arrangement 8. In the process of being connected to the floor 6 of the draft shield arrangement 5, the second part 8" of the fastening arrangement 8 can take three positions. In position C—symbolized by a wrench—the second part 8" of the fastening arrangement 8 can be set into, and taken out of, the floor 6 of the draft shield arrangement, with the first projections 19 passing through the cutouts 10 of the opening 7. By turning the second part 8" of the fastening arrangement 8 into the position B—symbolized by an open padlock—the second part 8" of the fastening arrangement 8 is brought into fixed engagement with the floor 6 of the draft shield arrangement 5. With a further turn into the position A—symbolized by a closed padlock—the draft shield arrangement 5 is secured, as the second part 8" of the fastening arrangement 8 enters into form-locking engagement with the first part 8" of the fastening arrangement 8 (see FIG. 1). Next, the metallic floor plate 14 (see FIG. 1 again) is set into place.

The draft shield arrangement 5 is of a conventional design, for example with slidable side walls 15 and a hinged top cover 16. Of course, there are also a multitude of other possible configurations.

As goes without saying, the foregoing description represents only an example. The fastening arrangement 8 could also be configured in other ways: for example, the first part 8' and the second part 8" could also be designed so that they attach to each other with a snap connection, or the second part 8" of the fastening arrangement 8 could be latched or screwed to the floor 6. Further possibilities are conceivable.

What is claimed is:

1. A balance, having functional elements including a load-introducing member, the balance comprising:
    a housing that accommodates the functional elements, with an opening through which the load-introducing member passes, the opening located on a top side of the housing when the balance is set up for operation;
    a draft shield arrangement, a floor of which has an opening through which the load introducing member passes, the opening corresponding to the housing opening when the housing and draft shield arrangement are operatively engaged; and
    an arrangement for fastening the draft shield arrangement to, and separating the draft shield arrangement from, the housing at the respective openings, the arrangement comprising:
        a rim of the housing opening, which serves as a first part of the fastening arrangement; and
        a second part of the fastening arrangement, arranged at the draft shield arrangement opening;
        the first and second parts cooperating as a bayonet coupling.

2. The balance of claim 1, wherein:
    the second part is releasably connected to the floor of the draft shield arrangement.

3. The balance of claim 2, wherein:
    the second part has a ring-shaped configuration that cooperates as the bayonet coupling with the draft shield arrangement opening.

4. The balance of claim 3, wherein:
    the second part has outward-pointing first projections; the opening of the draft shield arrangement has cutouts; and
    the second part is connected to the draft shield arrangement floor by inserting the first projections into the opening and turning the second part.

5. The balance of claim 3, wherein:
    an additional force-locking engagement secures a firm hold of the second part in the floor.

6. The balance of claim 1, further comprising:
    a channel on a top side of the second part, for catching and draining away liquids.

7. The balance of claim 1, wherein:
    the second part has second projections;
    the opening of the draft shield arrangement has cutouts; and
    the second part and the draft shield arrangement are fastened by inserting the second projections into the cutouts and turning the second part in the opening.

8. The balance of claim 7, further comprising:
    a rotation-delimiting element on the second part, which serves as a stop.

9. The balance of claim 8, further comprising:
    a tightening ramp at the second projection provides an additional force-locking engagement.

10. The balance of claim 9, wherein:
    the force for overcoming the engagement of the respective first and second parts is less than the force for overcoming the engagement of the second part in the draft shield arrangement floor.

11. The balance of claim 1, wherein:
    the floor of the draft shield arrangement comprises a material with sufficient elasticity such that impact forces which are sustained by the draft shield arrangement are transmitted to the balance only with damped intensity.

12. The balance of claim 1, further comprising:
    a metallic plate, set in the draft shield arrangement floor, providing an electrical ground connection to the draft shield arrangement.

13. The balance of claim 4, wherein:
    an additional force-locking engagement secures a firm hold of the second part in the floor.

14. The balance of claim 7, further comprising:
    a tightening ramp at the second projection provides an additional force-locking engagement.

* * * * *